United States Patent [19]

Yamashita et al.

[11] Patent Number: 5,182,680
[45] Date of Patent: Jan. 26, 1993

[54] RECORDING CONTROL SYSTEM

[75] Inventors: Keitaro Yamashita; Eiji Ogura, both of Kanagawa, Japan

[73] Assignee: Sony Corporation, Tokyo, Japan

[21] Appl. No.: 659,568

[22] Filed: Feb. 22, 1991

[30] Foreign Application Priority Data

Feb. 26, 1990 [JP] Japan ............................... 2-45197

[51] Int. Cl.[5] .............................................. G11B 5/09
[52] U.S. Cl. ...................................................... 360/60
[58] Field of Search ........................................... 360/60

[56] References Cited

U.S. PATENT DOCUMENTS

| 4,775,901 | 10/1988 | Nakano | 360/60 |
| 5,057,947 | 10/1991 | Shimada | 360/60 |
| 5,060,219 | 10/1991 | Lokhoff | 360/60 |

OTHER PUBLICATIONS

*Digital Logic and Computer Design* by M. Morris Mano ©1979, Prentice-Hall Inc., pp. 382-384.

*Primary Examiner*—Vincent P. Canney
*Attorney, Agent, or Firm*—Philip M. Shaw, Jr.

[57] ABSTRACT

A recording control system for preventing undesirable copy of information reproduced from a video tape onto another tape. The system includes a unit for receiving audio and video information signals from a video tape reproducing apparatus, a circuit for receiving an identification code from the video tape reproducing apparatus, a circuit for receiving timing signals from the video tape reproducing apparatus, a circuit for decoding the received identification code with reference to the received timing signals to generate recording control signals, a unit for recording the received audio and video information signals onto a video tape, and a circuit for controlling an operation of the recording unit in response to the recording control signals.

9 Claims, 10 Drawing Sheets

FIG. 3A
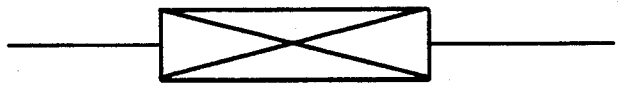
IDENTIFICATION CODE C
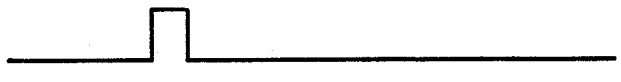
TIMING SIGNAL t
FIG. 3B
FIG. 4A
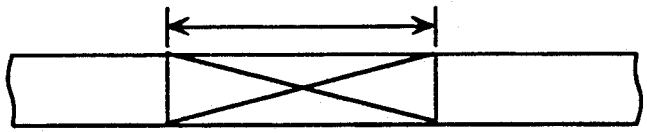
DATA d1
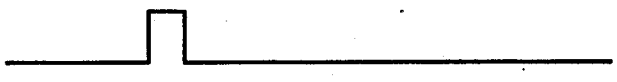
TIMING SIGNAL t
FIG. 4B

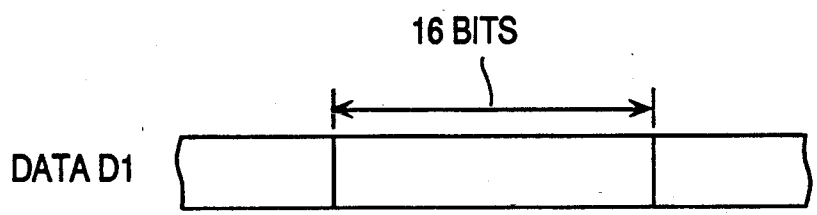
Fig. 10A
Fig. 10B
Fig. 10C
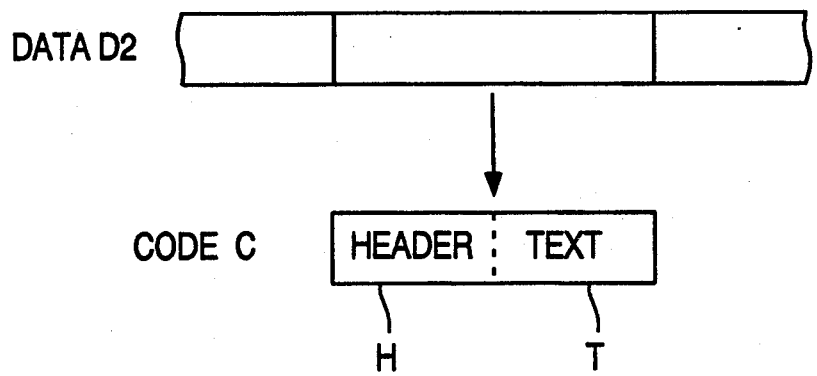
Fig. 11A
Fig. 11B

RECORDING CONTROL SYSTEM

BACKGROUND OF THE INVENTION

1. Field of the Invention

The present invention generally relates to a recording control system and more particularly relates to a recording control system capable of preventing dubbing operation or undesirable copy of recorded information.

2. Description of the Prior Art

In recent years, due to the spread of video tape recorders and audio tape recorders etc., illegal reproductions of video software or audio software etc. have appeared on the market as pirated editions or versions, so that the protection of the copyright of these software has been strongly demanded.

Thus, as a system for preventing the illegal-dubbing operation, such a system as a copy guard system utilizing the nature of the video signal etc. has been applied to the video software on the market. This copy guard system operates in a manner that, if an illegal dubbing operation is performed for video software or undesirable copying operation, noise data as well as the video software data are recorded onto a tape mounted on a recording unit side to thereby degrade the reproduced image of the video software in case of reproducing the tape where the video software is copied thereon together with the noise signal.

However, in the conventional illegal-dubbing preventing system, the noise signal is merely superimposed on the data of the video software in order to prevent the illegal dubbing operation, so that the noise signal can be easily removed from the reproduced data to thereby obtain a sure copy of the video software by connecting a device for removing the noise signal in the transmitting line between a reproducing unit and a recording unit and then the recording unit records the data from which the noise signal is removed by the device. Thus, the conventional illegal-dubbing preventing system can not perform the dubbing preventing operation sufficiently. Further, such a device for invalidating the illegal-dubbing preventing function of the conventional illegal-dubbing preventing system has already been on the market. Accordingly, it is required to provide an illegal-dubbing or undesirable copy preventing system whose illegal-dubbing or undesirable copy preventing function is difficult to be invalidated.

OBJECTS AND SUMMARY OF THE INVENTION

Accordingly, it is a general object of the present invention to provide an improved recording control system for preventing undesirable copying of a recorded tape in which the aforementioned shortcomings and disadvantages of the prior art can be eliminated.

More specifically, it is an object of the present invention to provide an improved recording control system which is capable of surely preventing an illegal dubbing operation or undesirable copying of data recorded on a tape where dubbing preventing data is recorded even if an attempt is made to invalidate the dubbing preventing data in a transmitting line between a reproducing unit and a recording unit.

According to a first aspect of the present invention, there is provided a recording control system for preventing undesirable copying of a recorded tape, which is comprised of a unit for receiving audio and video information signals along a plurality of transmission lines from a video tape reproducing apparatus, a circuit for receiving an identification code from the video tape reproducing apparatus along a first one of the plurality of transmission lines, a circuit for receiving timing signals from the video tape reproducing apparatus along a second one of the plurality of transmission lines a circuit for decoding the received identification code with reference to the received timing signals to generate recording control signals, a unit for recording the received audio and video information signals onto a video tape, and a circuit for controlling an operation of the recording unit in response to the recording control signals.

In accordance with a second aspect of the present invention, there is provided a recording control system for preventing undesirable copy of a recorded tape, which is comprised of a unit for receiving audio and video information signals from a video tape reproducing apparatus, a circuit for receiving a pair of identification codes transmitted from the video tape reproducing apparatus by way of a pair of transmitting lines respectively, a circuit for generating recording control signals with reference to the received pair of identification codes where both of the identification codes are used together to generate the recording control signals, a unit for recording received audio and video information signals onto a video tape, and a circuit for controlling an operation of the recording the unit in response to the recording control signals.

The above and other objects, features, and advantages of the present invention will become apparent from the following detailed description of illustrative embodiments thereof to be read in conjunction with the accompanying drawings, in which like numerals represent the same or similar parts.

BRIEF DESCRIPTION OF THE DRAWINGS

FIG. 3 is a timing chart illustrating the transmitting timing of an identification code;

FIG. 4 is a timing chart illustrating the reading timing of data from a data separating circuit;

FIG. 10 is an explanatory diagram illustrating an example of codes generated by a code generating circuit;

FIG. 11 is an explanatory diagram illustrating the reading and calculating processings performed in a decoder section;

DETAILED DESCRIPTION OF THE PREFERRED EMBODIMENTS

Figure 1:
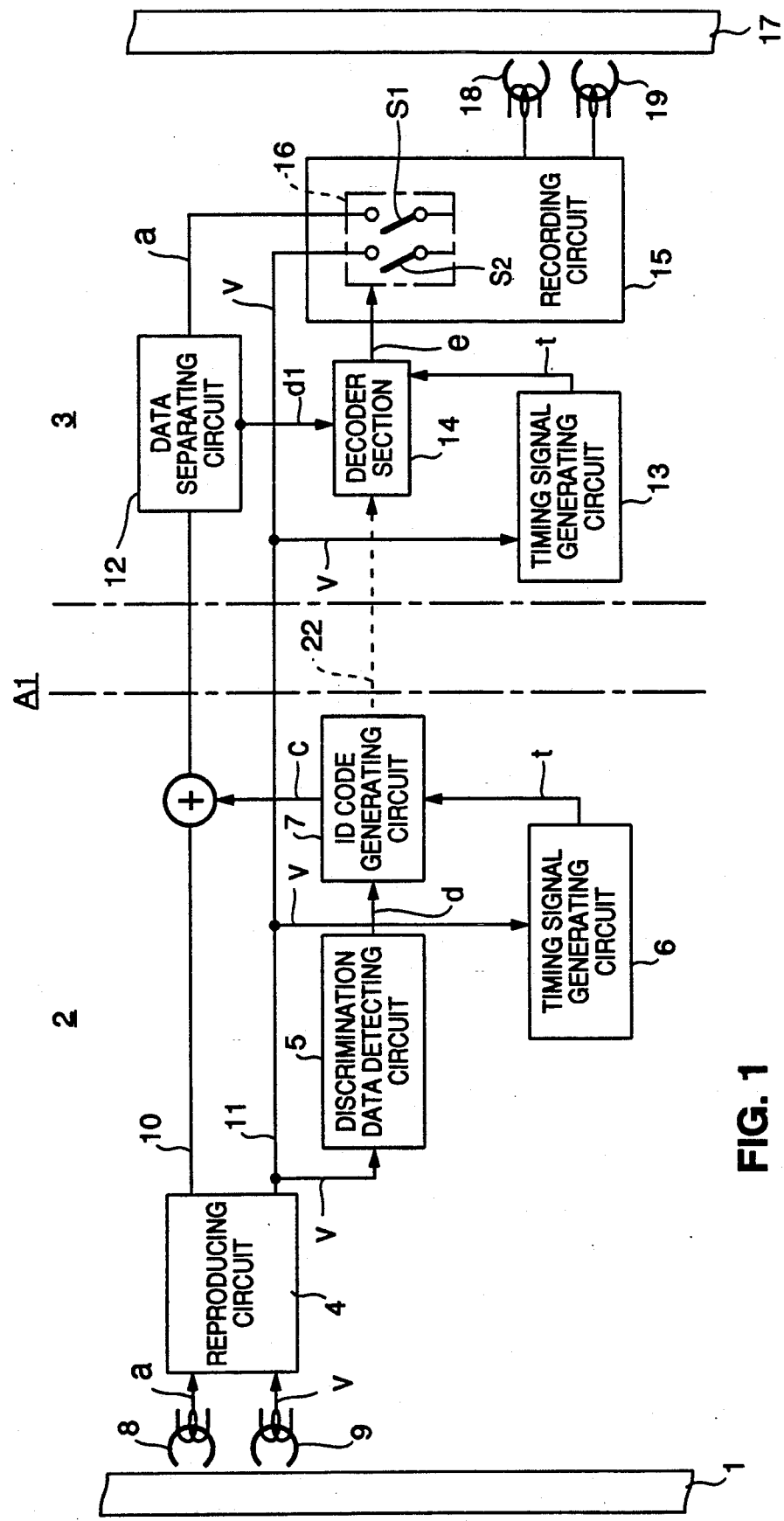
FIG. 1 is a block diagram illustrating the construction of a first embodiment of the recording control system according to the present invention.

Embodiments of the present invention will now be described by way of examples and with reference to the accompanying drawings, in which like reference numerals denote like corresponding parts throughout the drawings.

Figure 2:
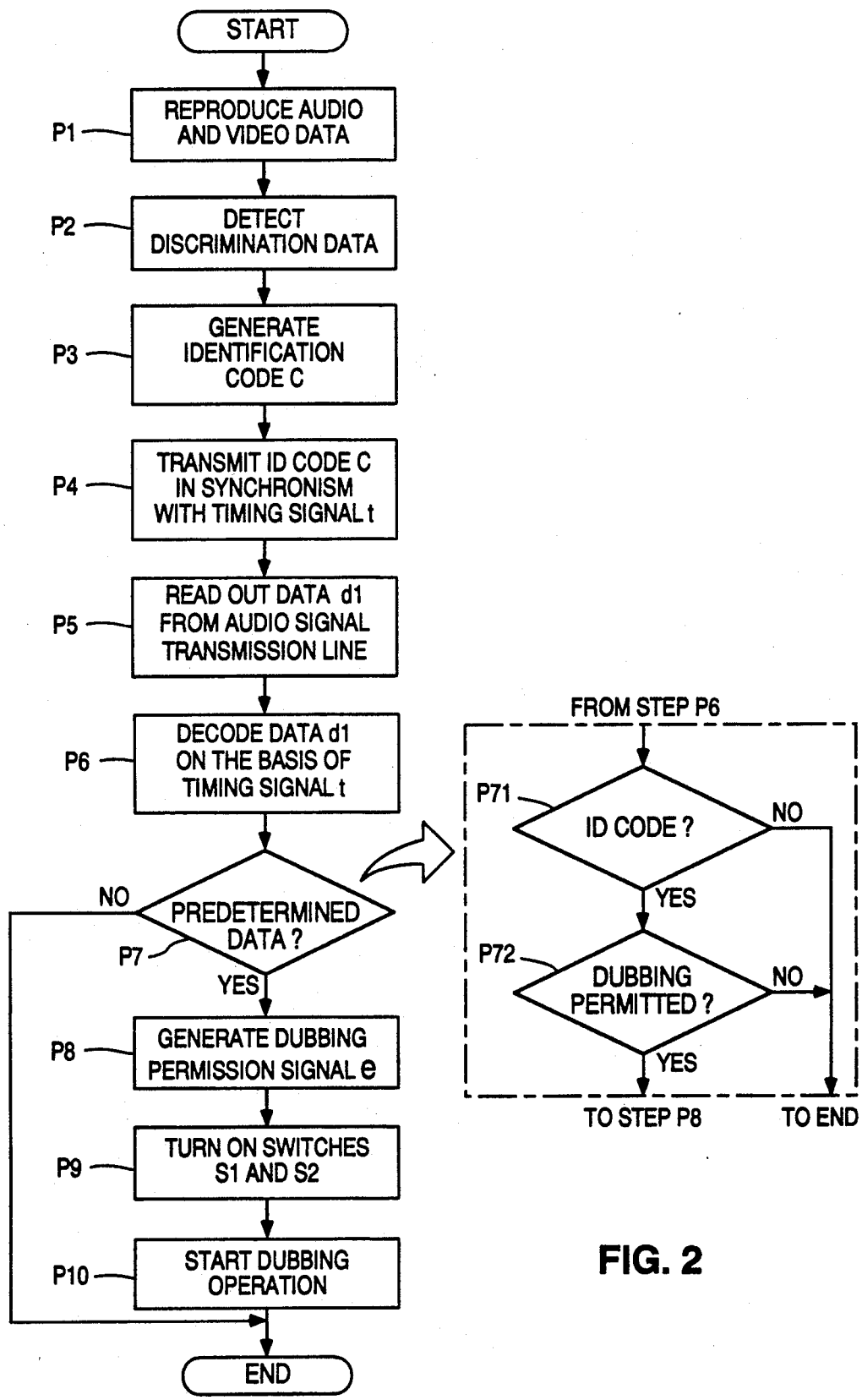
FIG. 2 is a flowchart illustrating an example of the operation of the first embodiment.

Referring to the drawings, FIG. 1 illustrates a block diagram of the construction of a first embodiment of a recording control system A1 according to the present invention and FIG. 2 illustrates a flowchart explaining the operations of the recording control system of FIG. 1. The construction and operation of the recording control system A1 will be explained hereinafter with reference to FIGS. 1 and 2.

As shown in FIG. 1, the recording control system A1 has a reproducing unit 2 and a recording unit 3. On a first magnetic tape (video tape) 1, discrimination data d including dubbing preventing data or undesirable copy preventing data as well as information data including video data and audio data are recorded. The discrimination data d is added to a pregiven section, e.g. a head section, of the video data of one field.

The reproduction unit 2 has a reproduction circuit 4, a discrimination data detecting circuit 5, a timing signal generating circuit 6 and an identification code generating circuit 7. The reproduction circuit 4 reproduces the audio data and the video data including the discrimination data d recorded on the first tape 1 by an audio head 8 and a video head 9, respectively and supplies a reproduced audio signal (analog audio signal) a and a reproduced video signal v having the data d to an audio signal transmitting line 10 and a video signal transmitting line 11, respectively, as shown in step P1 of FIG. 2. The discrimination data detecting circuit 5 picks up only the discrimination data d from the video signal v transmitted on the line 11 and applies it to the identification code generating circuit 7, as shown in step P2 of FIG. 2. The timing signal generating circuit 6 detects only a pregiven signal, e.g. a horizontal synchronizing signal, from the video signal v transmitted on the line 11 and applies it to thé identification code generating circuit 7 as a timing signal t.

The identification code generating circuit 7 generates an identification code c of a pregiven data capacity, e.g. 16 bits, on the basis of the discrimination data d applied from the discrimination data detecting circuit 5 as shown in step P3 of FIG. 2 and then supplies the identification code c to the audio signal transmitting line 10 in synchronism with the timing signal t from the timing signal generating circuit 6 as shown in FIG. 3 to thereby transmit the identification code c together with the audio signal a to the recording unit 3, as shown in step P4 of FIG. 2. In this case, the identification code c is transmitted in a frequency band which is outside the frequency band of the audio signal a, e.g. that higher than the frequency band of the audio signal a in order to prevent the identification code from interfering with the audio signal a in the recording unit 3.

The recording unit 3 includes a data separating circuit 12, a timing signal generating circuit 13, a decoder section 14 and a recording circuit 15.

The data separating circuit 12 is connected to the audio signal transmitting line 10 and extracts data dl of a frequency band where the identification code c exists from the data transmitted on the audio signal transmitting line 10 by such a circuit as a highpass filter or the like to thereby apply the extracted data dl to the decoder section 14, as shown in step P5 of FIG. 2. The circuit 12 further extracts the audio signal a through such a circuit as a low-pass filter or the like to thereby apply the extracted audio signal a to the recording circuit 15.

The timing signal generating circuit 13 detects only a pregiven signal, e.g. a horizontal synchronizing signal, from the video signal v transmitted on the line 11 and applies it to the decoder section 14 as a timing signal t.

The decoder section 14 decodes the data dl from the data separation circuit 12 in accordance with the timing signal t from the timing signal generating circuit 13, as shown in step P6 in FIG. 2. Namely, the decoder section 14 reads out pregiven data, e.g. data D of 16 bits, from the data dl in accordance with the timing signal t as shown in FIG. 4 and decodes the data D. The decoder section 14 thereafter generates a dubbing or copy permission signal e only when the decoded content of the data D coincides with a predetermined data, i.e. the identification code c, and indicates the allowance of dubbing or copying of the data to thereby deliver the signal e to the recording circuit 15, as shown in step P7 (steps P71 and P72) of FIG. 2.

The recording circuit 15 includes a switching section 16 therein which is constructed to record data read out from the first tape 1 on a second tape 17 through an audio head 18 and a video head 19 when all of all switches S1 and S2 of the switching section 16 are turned on. Each of the switches S1 and S2 of the switching section 16 is normally turned off and turned on only when the dubbing permission signal e from the decoder section 14 is applied thereto to thereby start the dubbing or copying operation of the data, as shown in steps P9 and P10 of FIG. 2.

Accordingly, the dubbing or copying operation of the data reproduced from the first tape 1 is permitted only when the dubbing preventing data or undesirable copy preventing data is not recorded on the first tape 1 and the identification code c generated in the reproducing unit 2 is transmitted to the recording unit 3 in synchronism with the timing signal t.

As described above, according to the first embodiment of the present invention, the reproducing unit 2 is constructed in a manner that it generates the identification code c based on the discrimination data d recorded on the first tape 1 and applies the code c to the audio signal transmitting line 10 in synchronism with the predetermined timing signal ( e.g. a horizontal synchronizing signal) t obtained from the video signal transmitted on the video signal transmitting line 11. Further, the recording unit 1 is constructed in a manner that it extracts the data dl from the audio signal transmitted on the audio signal transmitting line 10 and decodes the extracted data dl in response to the predetermined timing signal t obtained from the video signal transmitted on the audio signal transmitting line 11 to thereby discriminate the content of the data dl.

Thus, even if such a device for rewriting data transmitted on the audio signal transmitting line 10 or the video signal transmitting lines 11 is inserted in the line 10 or 11 and then predetermined data among the data transmitted through the reproducing unit 2 from the first tape 1, i.e. the discrimination data d, is rewritten to thereby invalidate the data d, a time lag is generated between the data on the video and audio signal transmitting lines 10 and 11. Therefore, the identification code c transmitted on the audio signal transmitting line 10 can not be decoded correctly in the recording unit 3, so that the dubbing or copying of the data on the first tape is made impossible.

Namely, in the first embodiment, even if such an operation for invalidating the identification data d is performed on the transmitting line 10 or 11, the dubbing or copying operation of a tape where the dubbing preventing data is recorded can be surely prevented.

Various modifications of the first embodiment will be described hereinafter with reference to FIGS. 5 to 7.

Figure 5:
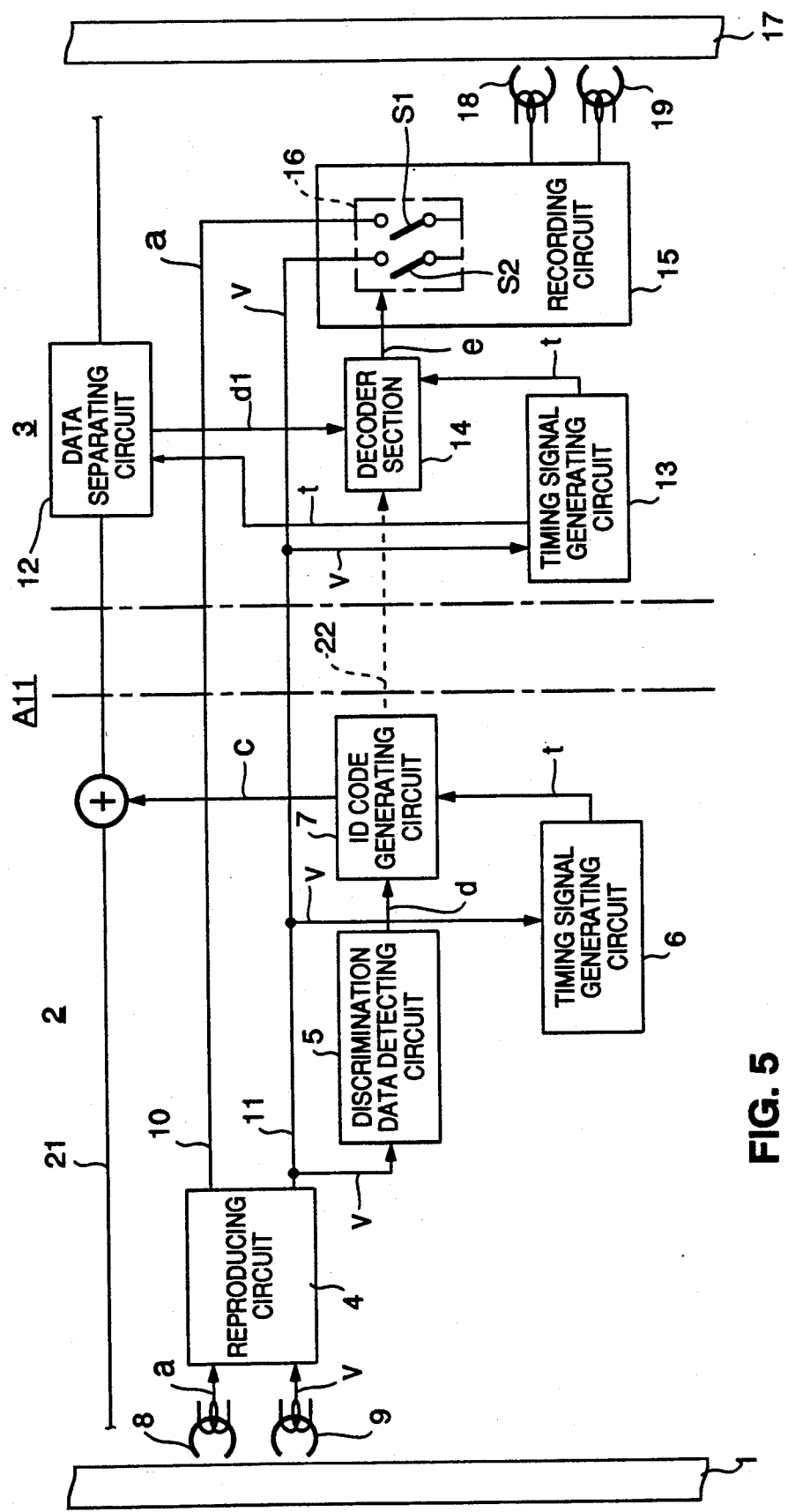
FIG. 5 is a block diagram illustrating the construction of a first modification of the first embodiment.

FIG. 5 is a block diagram illustrating a recording control system A11 according to a first modification of the first embodiment. The recording control system A11 fundamentally has almost the same construction as the first embodiment but differs from the first embodiment in the point that a control signal transmitting line 21 is additionally provided and the identification code c from the identification code generating circuit 7 is applied to the line 21 instead of the audio signal transmitting line 10.

The control signal transmitting line 21 is such a line as to enable a system control such as a home bus system of an audio visual (AV) system by connecting devices thereby. Namely, in case of selecting viewing of reproduced video images by a remote controller etc., a selecting signal indicating the viewing of the reproduced video images is transmitted on the control signal transmitting line 21 to thereby apply power to a video tape recorder, an amplifier and a television receiver etc. Alternatively, if listening of audio sound set is selected by the remote controller etc., a selecting signal indicating the listening of the audio sound etc. is transmitted on the line 21 to thereby apply power to a cassette deck, a compact disk player and an amplifier etc.

The reproducing unit 2 transmits an identification code c from the identification code generation circuit 7 in synchronism with the timing signal t from the timing signal generating circuit 6 on the control signal transmitting line 21.

In the recording unit 3, the timing signal generating circuit 13 detects a signal, e.g. the horizontal synchronizing signal from the video signal on the video signal transmitting line 11 and applies the detected synchronizing signal to the data separating circuit 12 and the decoder section 14 as the timing signal t. The data separating circuit 12 extracts data d1 of the identification code c from data transmitted on the line 21 in accordance with the timing signal t from the timing signal generating circuit 13 and applies the extracted data d1 to the decoder section 14. The decoder section 14 decodes the data d1 from the data separating circuit 12 in accordance with the timing signal t from the timing signal generating circuit 13 and generates a dubbing or copy permission signal e only when a decoded content of the data d1 coincides with a predetermined data, i.e. the identification code c, and indicates an allowance of dubbing or copy of the data to thereby deliver the signal e to the recording circuit 15. The recording circuit 15 then records the data on the first magnetic tape 1 transmitted through the lines 10 and 11 onto the second magnetic tape 17 in accordance with the dubbing permission signal e from the decoder section 14.

Next, the explanation will be made about a recording control system A12 according to a second modification of the first embodiment with reference to FIG. 6. The recording control system A12 of the second modification differs from the recording control system A1 of the first embodiment in the following points. The timing signal generating circuit 6 detects a synchronizing signal from a digital audio signal a transmitted on an audio signal transmitting line 10 and applies the detected synchronizing signal to the identification code generating circuit 7 as the timing signal t. The identification code generating circuit 7 applies the identification code c to the video signal transmission line 11 in synchronism with the timing signal t from the timing signal generating circuit 6. In this case, in order to prevent the identification code c from interfering with a video signal in the recording unit 3, the identification code c is transmitted on the line 11 by being inserted in such a video signal section as a vertical blanking period of the video signal v or the like.

In the recording unit 3, a timing signal generating circuit 13 detects a synchronizing signal from a digital audio signal a transmitted on the audio signal transmitting line 10 which is one of the same kind as the synchronizing signal detected by the timing signal generating circuit 6 of the reproducing unit 2 and applies the detected synchronizing signal to the data separating circuit 12 and the decoder section 14 as the timing signal t. The data separating circuit 12 extracts data d1 from the identification code c which exists in the vertical blanking period of the video signal v transmitted on the video signal line 11 in accordance with the timing signal t from the timing signal generating circuit 13 and then applies the extracted data d1 to the decoder section 14. The decoder section 14 decodes the data d1 from the data separating circuit 12 in accordance with the timing signal t from the timing signal generating circuit 13 and generates a dubbing or copy permission signal e only when a decoded content of the data d1 coincides with a predetermined data, i.e. the identification code c, and means an allowance of dubbing or copy of the data to thereby deliver the signal e to the recording circuit 15. The recording circuit 15 then records the data on the first magnetic tape 1 transmitted through the lines 10 and 11 onto the second magnetic tape 17 in accordance with the dubbing permission signal e from the decoder section 14.

Next, the explanation will be made about a recording control system A13 according to a third modification of the first embodiment with reference to FIG. 7.

Figure 6:
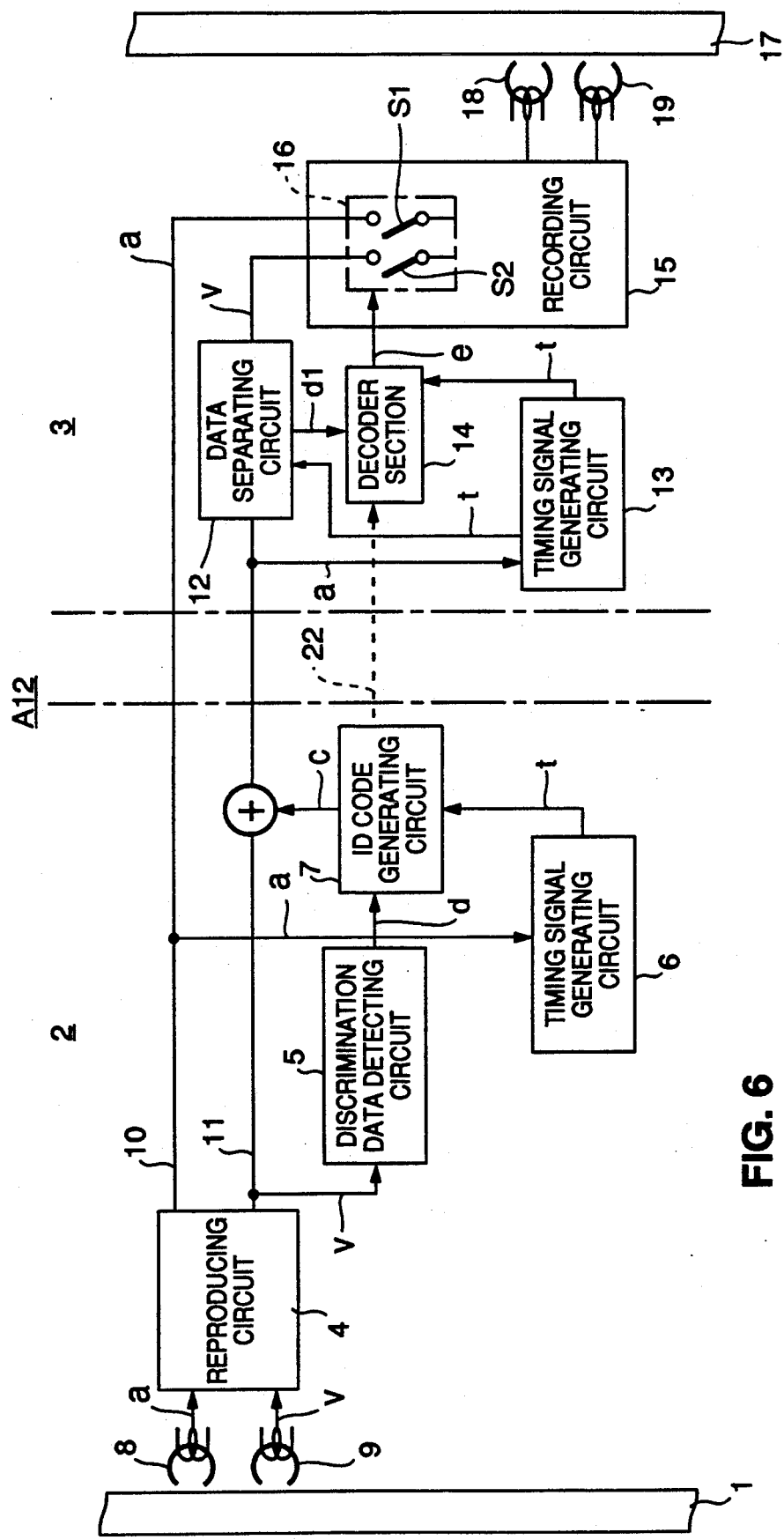
FIG. 6 is a block diagram illustrating the construction of a second modification of the first embodiment.
Figure 7:
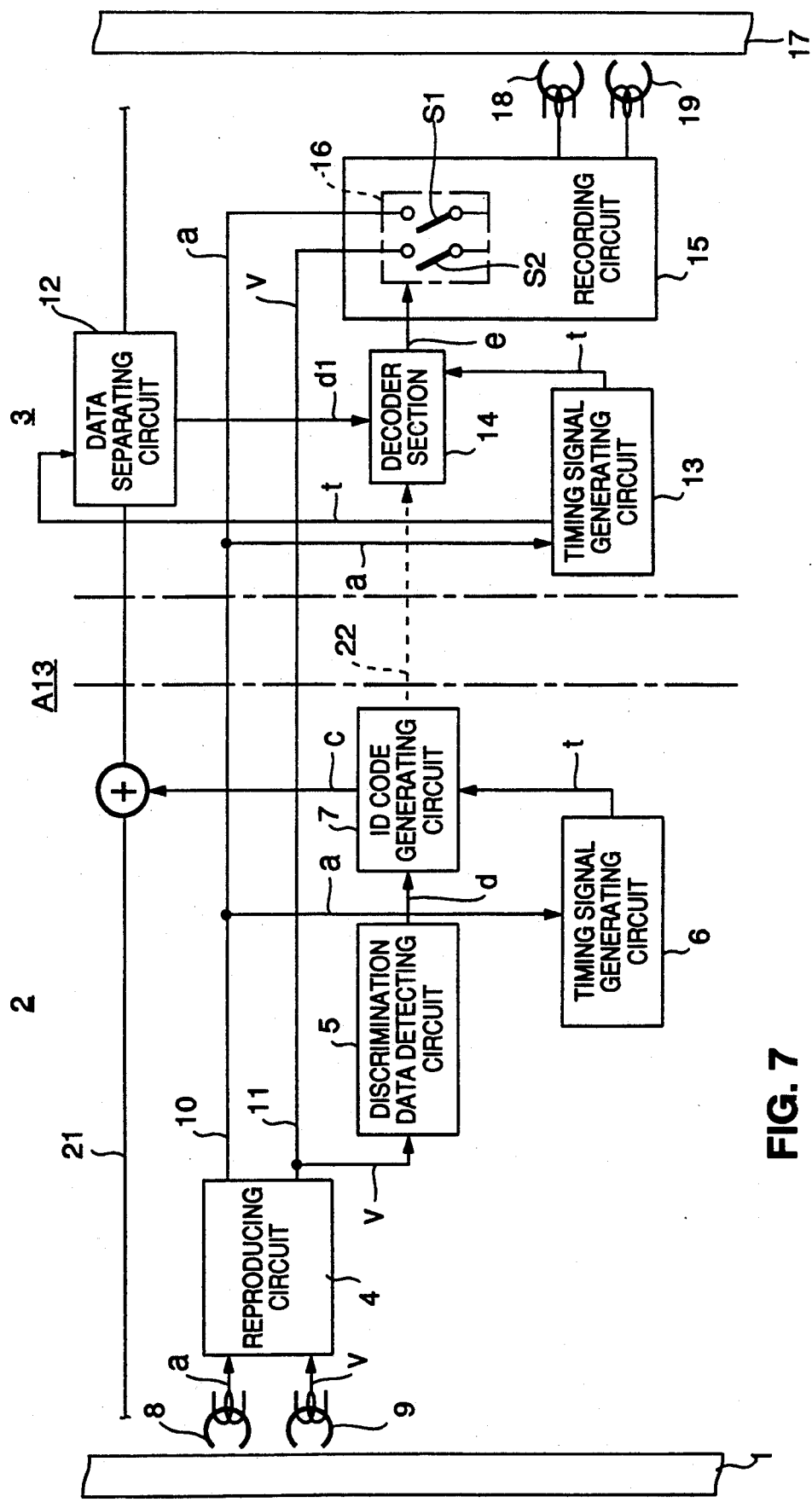
FIG. 7 is a block diagram illustrating the construction of a third modification of the first embodiment.

The circuit configuration of the recording control system A13 is almost the same as that of the second modification A12 of FIG. 6 but differs therefrom in a point that the identification code c from the identification code generating circuit 7 is transmitted on a control signal transmitting line 21 which transmits such a signal as a selecting signal as in the case of the first modification of FIG. 5. Namely, in the reproducing unit 2, the identification code c from the identification code generating circuit 7 is transmitted on the control signal transmitting line 21 in synchronism with the timing signal t from the timing signal generating circuit 6. Further, in the recording unit 3, the data separating circuit 12 extracts data d1 from the identification code c transmitted on the line 21 in synchronism with a timing signal t from the timing signal generating circuit 13 and applies the extracted data d1 to the decoder section 14. Other circuit configurations and functions of the recording control system A13 are substantially the same as those of the second modification and so the explanation thereof will be omitted.

According to each of the first to third modifications, as in the case of the recording control system A1 of the first embodiment, dubbing or undesirable copy of the data recorded on the tape 1 where dubbing preventing data or undesirable copy preventing data is recorded can be surely prevented even if such an operation of invalidating the discrimination data recorded on the tape 1 is performed on the data transmitted on the video signal transmitting line 11, the audio signal transmitting line 10 or the control signal transmitting line 21.

Now, in each of the first embodiment and the first to third modifications thereof, the identification code c from the identification code generating circuit 7 may be sent to the recording unit 3 through a dedicated transmitting line 22 shown by a broken line in each of FIGS. 1 and 5 to 7.

Figure 8:
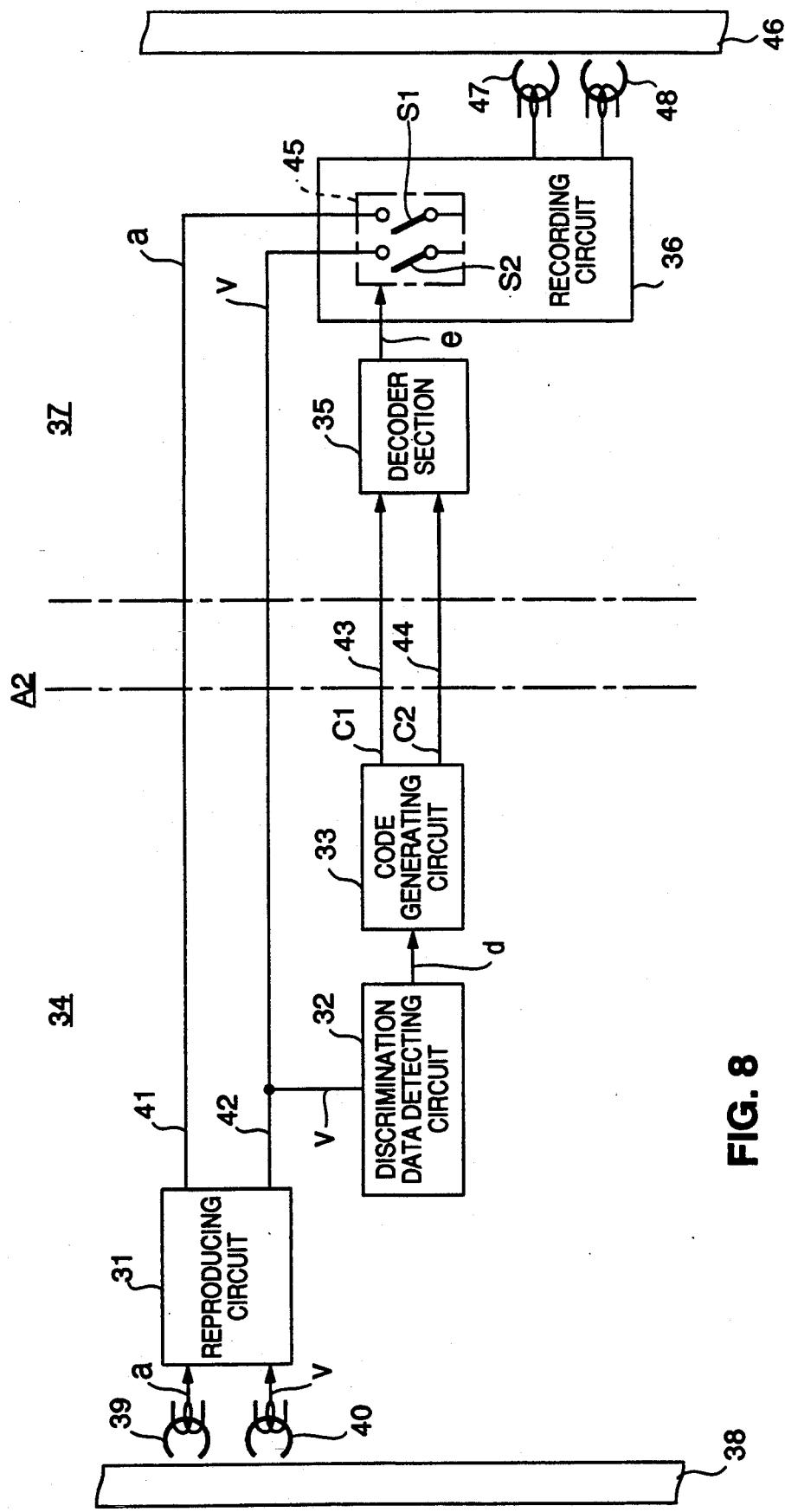
FIG. 8 is a block diagram illustrating the construction of a second embodiment of the recording control system according to the present invention.

A recording control system A2 according to a second embodiment of the present invention will be explained referring to FIGS. 8 and 9.

The recording control system A2 includes a reproducing unit 34 having a reproducing circuit 31, a discrimination data detecting circuit 32 and a code generating circuit 33 and a recording unit 37 having a decoder section 35 and a recording circuit 36.

Figure 9:
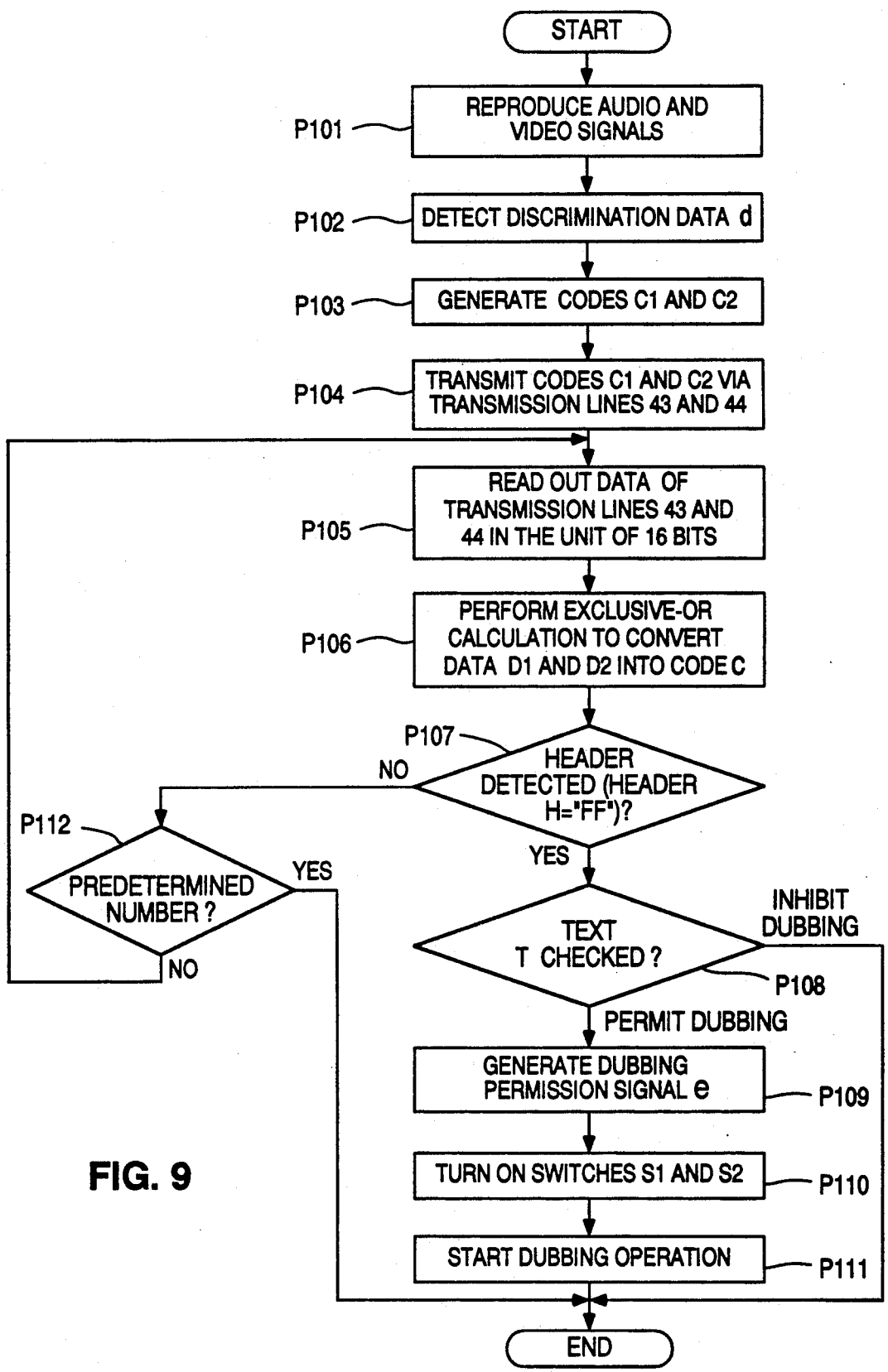
FIG. 9 is a flowchart illustrating the example of the operation of the second embodiment.

In the reproducing unit 34, the reproducing circuit 31 reproduces, as in the same manner as the first embodiment, audio data and video data including discrimination data d recorded on a first magnetic tape 38 by an audio head 39 and a video head 40, respectively and applies the reproduced audio signal a and the reproduced video signal v to an audio signal transmitting line 41 and a video signal transmitting line 42, respectively, as shown in step P101 in FIG. 9.

The discrimination data detecting circuit 32 detects only the discrimination data d from the video signal v transmitted on the video signal transmitting line 42 and applies the detected discrimination data d to the code generating circuit 33, as shown in step P102 in FIG. 9. The code generating circuit 33 generates two kinds of codes C1 and C2 in accordance with the data d from the discrimination data detecting circuit 32 as shown in step P103 of FIG. 9. In this case, each of the codes C1 and C2 is constituted by data of 16 bits in a manner that when these codes are subjected to a predetermined calculation in the decoder section 35 of the recording unit 37, a correct calculation result is obtained, that is, the result coincides with a predetermined value.

Namely, in this embodiment, if the first tape 38 is a tape unnecessary for preventing the dubbing operation, the codes C1 and C2 are set to be "6352" and "9AA7" in the hexadecimal notation respectively as shown in FIG. 10 so that the result of the calculation, e.g. the EXCLUSIVE-OR operation, of the data C1 and C2 executed in the decoder section 35 becomes the predetermined value, e.g. "FF95" in the hexadecimal notation, where "FF" represents a header and "95" represent the permission of the dubbing operation. On the other hand, if the first tape 38 is a tape which requires prevention of a dubbing operation, the codes C1 and C2 are set in such a manner that the result of the calculation in the decoder section 35 becomes "FF96", where "FF" represents a header and "96" represents the inhibition of the dubbing operation. The codes C1 and C2 are transmitted on dedicated transmitting lines 43 and 44 respectively and applied to the recording unit 37, as shown in step P104 of FIG. 9.

Meanwhile, the decoder section 35 of the recording unit 37 reads out two kinds of data D1 and D2 from the data transmitted on the transmitting lines 43 and 44 in units, 16-bit, for example, as shown in FIG. 11 (step P105 of FIG. 9), and then subjects the data D1 and D2 to such a calculation as the EXCLUSIVE-OR operation to convert it into a code C constituted of a header H of 8 bits, for example, and a text T of 8 bits, for example, as shown in step P106 of FIG. 9. The decoder section 35 thereafter judges whether the content of the header H is correct or not as shown in step P107 of FIG. 9. When the judgement is YES, that is, the content of the header H is "FF" as shown in the example of FIG. 10, the decoder section 35 discriminates the content of the text T as shown in step P108. When it is determined by the decoder section 35 that the content of the text T represents the permission of the dubbing operation, e.g. "95", the decoder section 35 generates a dubbing permission signal e to be delivered to the recording circuit 36, as shown in step P109 in FIG. 9.

Namely, the decoder section 35 generates the dubbing permission signal e when the two kinds of codes C1 and C2 are read out correctly and the content of these codes represents the permission of the dubbing operation.

The recording circuit 36 includes, as in the case of the first embodiment, a switching section 45 therein and is constituted in a manner that each of switches S1 and S2 thereof is turned on in response to the detection of the dubbing permission signal e from the decoder section 35 to thereby record the data on the first tape 38 onto a second tape 46 through an audio head 47 and a video head 48, as shown in steps P110 and P111 of FIG. 9.

When it is judged in step P107 that the content of the header H is incorrect, the processing returns to step 105. In step 105, the decoder section 35 reads out next data of 16 bits from each of the data D1 and D2 and again executes the EXCLUSIVE-OR operation of these next data to convert into the code C and then judges the content of the header H as in the same manner as described above. These procedures are repeatedly executed until the correct result is obtained in the content of the header H. Namely, steps P105 to 107 are repeatedly executed until a predetermined content is detected in the header H. Now, the transmission of the codes C1 and C2 from the reproducing unit 34 onto the transmitting lines 43 and 44 is performed at the primary stage, so that it is meaningless to repeat the procedures of steps 105 to 107 for a long period of time. Thus, in order to provide a time limit of repetition of these steps, this embodiment provides such a step 112 in a feedback path from step P107 to step P105 that the procedure is terminated when it is judged that the correct content is not obtained in the header H even if the judging procedure of the content of the header is repeated for a predetermined number of times.

According to the second embodiment, the reproducing unit 34 supplies the two kinds of codes C1 and C2 on the basis of the discrimination data d to the dedicated transmitting lines 43 and 44 respectively, while the recording unit 37 subjects the data D1 and D2 transmitted through the transmitting lines 43 and 44 to the predetermined calculation to thereby discriminate the result of the calculation and the predetermined data. Thus, this embodiment judges the timings of the data D1 and D2, i.e., the two kinds of data C1 and C2 transmitted to the recording unit 37 from the transmitting lines 43 and 44 more strictly when compared with the first embodiment in order to judge the permission of the dubbing operation. Namely, this embodiment requires more rigidly that the transmitting timings of the data C1 and C2 to the recording unit 37 are to be simultaneous. Thus, if such an operation of invalidating the discrimination data d by modifying the data transmitted on the transmitting lines 43 and 44 as the rewriting of the code C1 or C2 is performed, there occurs a difference in transmitting timing to the recording unit 37 between the data on the transmitting lines 43 and 44, so that the decoder section 35 can not read out the codes C1 and C2 correctly due to the timing difference to thereby make the dubbing operation impossible. Accordingly, this second embodiment can more surely prevent the dubbing operation of data recorded on the tape where the dubbing preventing data is recorded. Now, even if such an operation of invalidating the discrimination data d recorded on the first tape 38 by modifying the data transmitted on the video signal transmitting line 42, the dubbing operation can be surely prevented since the recording section 37 judges the permission of the dubbing operation by discriminating the data transmitted through the dedicated transmitting lines 43 and 44.

Figure 12A:
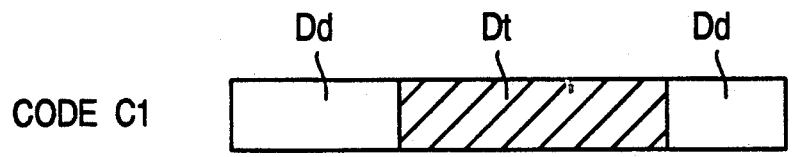
FIG. 12 is an explanatory diagram illustrating another example of codes generated by the code generating circuit.
Figure 12B:
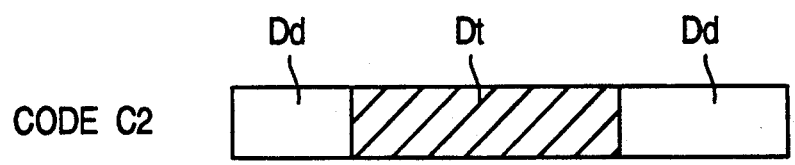
Figure 13A:
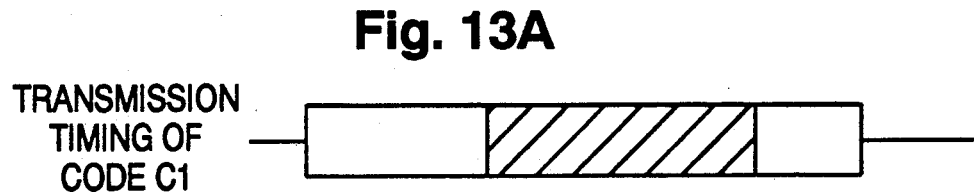
FIG. 13 is a timing chart illustrating the transmitting timing of the codes of FIG. 12.
Figure 13B:
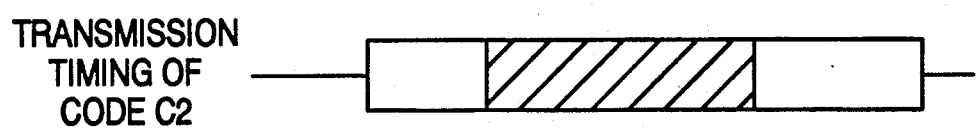

In this embodiment, if the two kinds of codes C1 and C2 generated by the code generating circuit 33 are modified in a manner as shown in FIG. 12 that each of the codes C1 and C2 includes not only as a part thereof a data section Dt necessary for judging the permission of the dubbing operation but also a dummy data portion Dd unnecessary for judging the permission of the dubbing operation, the heading portions of the codes C1 and C2 can be shifted in transmitting timing to each other as shown in FIG. 13. In this case, it becomes more difficult to invalidate the discrimination data by decoding the data transmitted on the transmitting lines 43 and 44, so that the dubbing operation of data recorded on the tape where the dubbing preventing data is recorded can be more surely prevented.

In this embodiment, further the two kinds of codes C1 and C2 are transmitted to the recording unit 37 through the dedicated transmitting lines 43 and 44, but they may be transmitted through the audio signal and video signal transmitting lines 41 and 42. In this case, if the audio signal a is an analog signal, the code C1 or C2 may be transmitted with such a frequency band thereof as that being outside the frequency band of the audio signal a.

The explanations of the above-described embodiments and modifications are made in a case where the dubbing operation is performed in a single recording control system, but this invention is also applicable to a case where the dubbing operation is performed among a plurality of recording control systems.

Accordingly, the recording control system according to the present invention can surely prevent the dubbing operation of data recorded on a tape where the dubbing preventing data is recorded even if such an operation of invalidating the dubbing preventing data is performed by modifying the data transmitted on a transmitting line between the reproducing unit and the recording unit, thereby protecting the copyright more effectively.

Having described preferred embodiments of the invention with reference to the accompanying drawings, it is to be understood that the invention is not limited to those precise embodiments and that various changes and modifications there of could be effected by one skilled in the art without departing from the spirit or scope of the novel concepts of the invention as defined in the appended claims.

We claim as our invention:

1. A recording control system for preventing undesirable copy of a recorded tape, comprising:
    a) means for receiving audio and video information signals from a video tape reproducing apparatus, said audio and video signals being sent to said recording control system by means of a plurality of transmission lines;
    b) means for receiving an identification code from said video tape reproducing apparatus, said identification code being sent to said recording control system along a first one of said plurality of transmission lines;
    c) means for receiving timing signals from said video tape reproducing apparatus, said timing signals being sent to said recording control system along a second one of said plurality of transmission lines;
    d) means for decoding said received identification code with reference to said received timing signals to generate recording control signals;
    e) means for recording said received audio and video information signals onto a video tape; and
    f) means for controlling an operation of said recording means in response to said recording control signals.

2. A recording control system as cited in claim 1, wherein said audio and video information signals are separately transmitted on different ones of said plurality of transmission lines from said video tape reproducing apparatus.

3. A recording control system as cited in claim 2, wherein said identification code is superimposed on said audio information signal.

4. A recording control system as cited in claim 2, wherein said identification code is transmitted from said video tape reproducing apparatus by way of a different one of said plurality of transmission lines than is used for the transmission of either the audio or video information signals.

5. A recording control system as cited in claim 3 or 4, wherein said timing signals are extracted from said received video information signals.

6. A recording control system as cited in claim 4, wherein said timing signals are superimposed on said audio information signal from said video tape reproducing apparatus.

7. A recording control system as cited in claim 2, wherein said identification code is superimposed on said video information signal.

8. A recording control system for preventing undesirable copy of a recorded tape, comprising:
    1) means for receiving audio and video information signals from a video tape reproducing apparatus;
    2) means for receiving a pair of identification codes transmitted from said video tape reproducing apparatus by way of a pair of transmitting lines respectively;
    3) means for generating recording control signals with reference to said received pair of identification codes, wherein both of said identification codes are used together to generate said recording control signals;
    4) means for recording said received audio and video information signals onto a video tape; and
    5) means for controlling an operation of said recording means in response to said recording control signals.

9. A recording control system as cited in claim 8, wherein said recording control signal generating means includes an EXCLUSIVE-OR logics to be applied to said received pair of identification codes.

* * * * *